United States Patent
Leung (10) Patent No.: US 11,874,118 B2
(45) Date of Patent: Jan. 16, 2024

(54) CROWDSOURCING MAP MAINTENANCE

(71) Applicant: GM Cruise Holdings LLC, San Francisco, CA (US)

(72) Inventor: Katherine Leung, Milpitas, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 526 days.

(21) Appl. No.: 16/680,666

(22) Filed: Nov. 12, 2019

(65) Prior Publication Data

US 2021/0140772 A1   May 13, 2021

(51) Int. Cl.
| | |
|---|---|
| *G06F 16/29* | (2019.01) |
| *G06Q 50/00* | (2012.01) |
| *G06Q 50/30* | (2012.01) |
| *G01C 21/30* | (2006.01) |
| *G01C 21/34* | (2006.01) |

(52) U.S. Cl.
CPC ......... *G01C 21/30* (2013.01); *G01C 21/3438* (2013.01); *G06F 16/29* (2019.01); *G06Q 50/01* (2013.01); *G06Q 50/30* (2013.01)

(58) Field of Classification Search
CPC ............. G01C 21/30; G01C 21/3438; G01C 21/3856; G06F 16/29; G06F 16/587; G06Q 50/01; G06Q 50/30
See application file for complete search history.

(56) References Cited

U.S. PATENT DOCUMENTS

| | | | | |
|---|---|---|---|---|
| 10,584,971 | B1 * | 3/2020 | Askeland | G01C 21/3859 |
| 2015/0331890 | A1 * | 11/2015 | Har-Noy | G06Q 30/0282 |
| | | | | 707/722 |
| 2017/0277716 | A1 * | 9/2017 | Giurgiu | G06F 16/29 |
| 2019/0279247 | A1 * | 9/2019 | Finken | G06F 21/602 |
| 2019/0384294 | A1 * | 12/2019 | Shashua | G06F 16/29 |
| 2020/0372012 | A1 * | 11/2020 | Averbuch | G06F 16/2379 |

* cited by examiner

*Primary Examiner* — Geepy Pe
*Assistant Examiner* — Paulo Roberto Gonzalez Leite
(74) *Attorney, Agent, or Firm* — Novak Druce Carroll LLP (57) ABSTRACT

A non-transitory computer readable-medium comprising instructions that when executed causes at least one processor to determine a portion of a map for user identification, send a request to a user, and receive from a user a response to the request. The portion of the map may correspond to a location. The request may be to identify features existing at the location. The communication may direct the user to the location. The response to the request may include identification of a labeled feature with a location coded picture of the labeled feature.

19 Claims, 4 Drawing Sheets

CROWDSOURCING MAP MAINTENANCE

TECHNICAL FIELD

The present technology relates to map maintenance and more particularly to crowd sourcing map maintenance.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

A map is integral to the autonomous vehicle because the autonomous vehicle utilizes the map to determine how and where to navigate to various locations. Over time, data in the map may become outdated and incorrect. Human drivers may use their own senses and judgment to adapt to changes to roads. However, it is challenging for autonomous vehicles to determine changes to the roads that are not reflected in the map. Accordingly, it is also challenging for the autonomous vehicle to react and adapt to changes to the roads.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

In general, roads change over time due to construction. In traditional vehicles with human drivers, the human drivers may observe the changes directly and use their judgment to determine how to adapt to the road changes. Even so, human drivers may still rely on a map to reroute around road changes. Thus, when a map is outdated, it is challenging for the driver to determine a suitable route to arrive at an intended destination. An autonomous vehicles lacks a human driver, so it is even more challenging for the autonomous vehicle to determine road changes and how best to adapt or reroute around the road changes.

Thus, it is important for maps to be updated with relatively high frequency to minimize the frequency of vehicles observing inaccurate map data. In general, map maintenance is challenging because of the amount of information or map data in the map. Furthermore, autonomous vehicles rely heavily on minute details of high quality map data, which further exacerbates the sheer amount of information in the map. In some instances, these minute details are map labels that identify signs (e.g., stop signs), road features (e.g. cross walks, bike lanes, driveways, etc.), address features (business names, characteristics regarding a business, etc.), etc. These labels require capturing of some data and interpreting the data. While it is relatively easier for a human to determine what he/she sees, it is challenging for machines to do the same.

Passengers of the autonomous vehicles may be all over the place, seeing feature and locations in real life. On the other hand, machines work simply on pictures from a capture vehicle or the like. Thus, it is contemplated that better interpretation of features and locations may be achieved through crowd sourcing as opposed to sending images back to a data center without crowdsource identification.

However, purely crowd sourcing this data may provide potential concerns. Since the autonomous vehicles will rely heavily on this data, any bad actors and/or data may cause unnecessary danger. Thus, the disclosed technology addresses the need in the art for an efficient process for maintaining maps and map data, while maintaining a high confidence level for accuracy.

Figure 1:
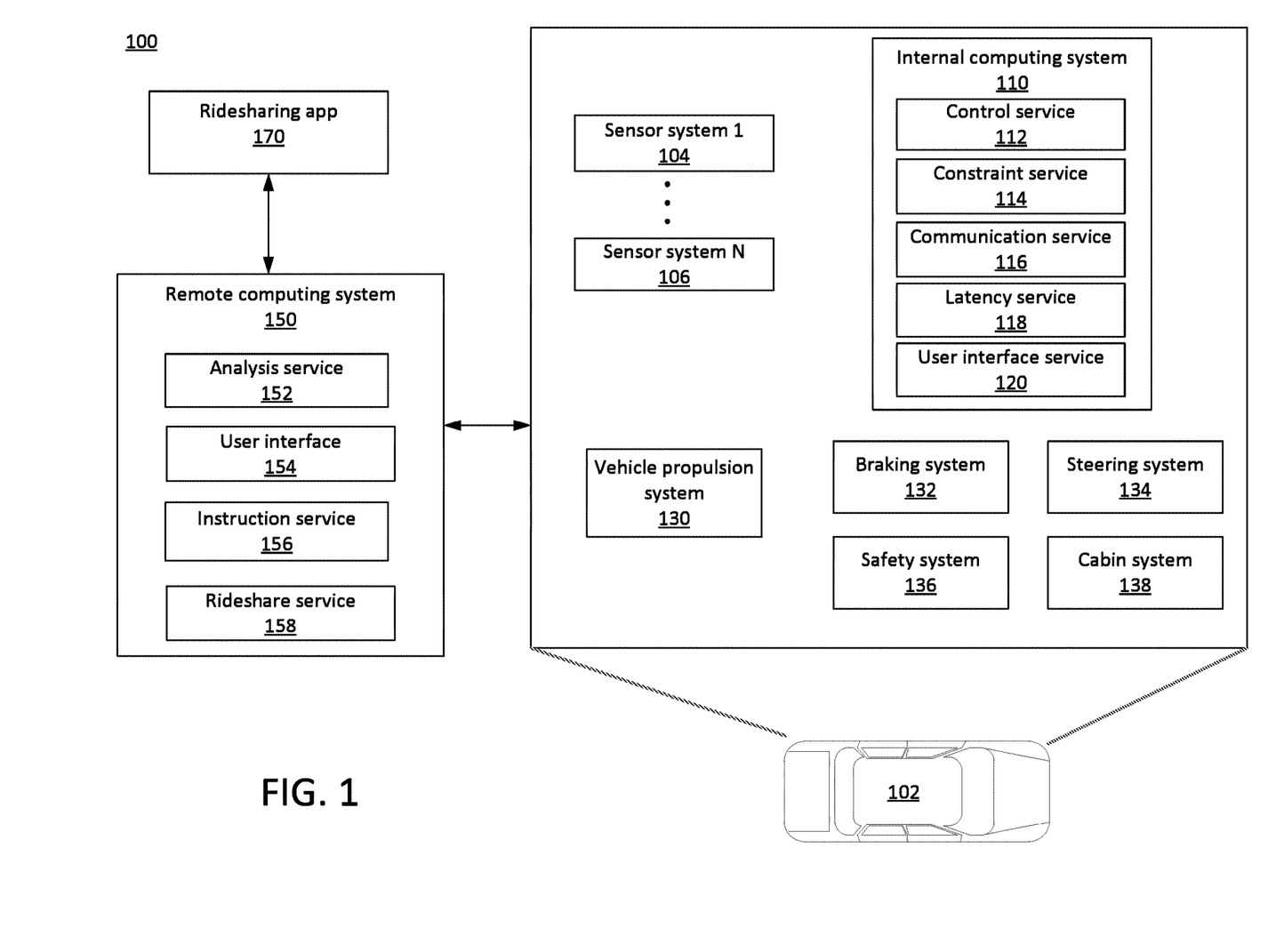
FIG. 1 shows an example of a content management system and client devices.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system, and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control the operation of the vehicle propulsion system 130, the braking system 108, the steering system 110, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing application 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 2:
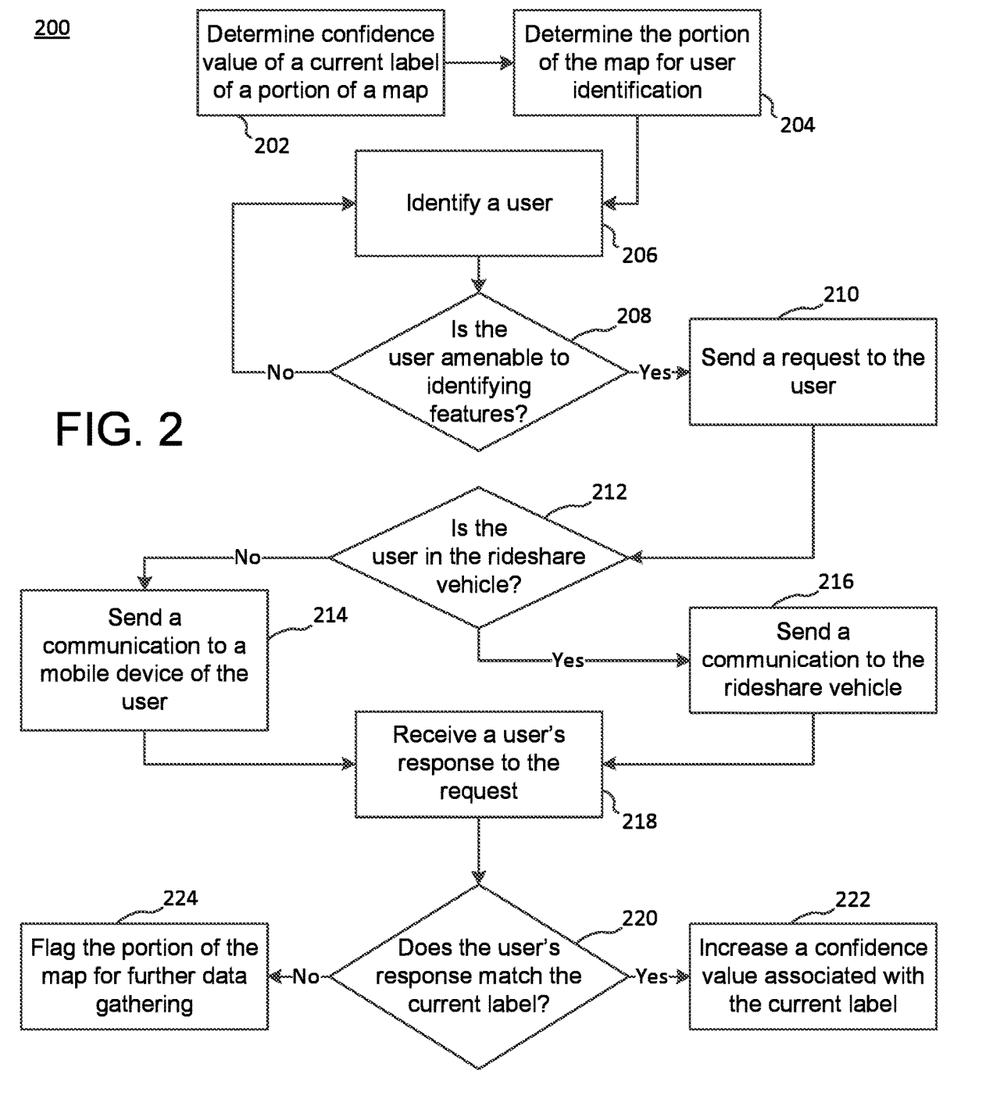
FIG. 2 is a flow diagram that illustrates an example process for crowd sourcing map maintenance.

FIG. 2 is a flow diagram that illustrates an example process 200 for map maintenance. While it is to be understood that the process 200 may be executed by any computing system, the discussion below implements process 200 through the remote computing system 150 for clarity and discussion purposes.

A portion of a map can correspond to a location. The portion of the map may have one or more features in, at, and/or around the location. Similarly, the features may be signs (e.g., stop signs), road features (e.g. cross walks, bike lanes, driveways, etc.), address features (business names, types or categories of businesses, etc.), etc. In some embodiments, the feature has specific characteristics or attributes identified (e.g. condition, size, color, shape, etc.). For example, the location may have a coffee shop, a feature, and the coffee shop may have outdoor seating, a characteristic or attribute. As another example, the location may have a stop sign (i.e. a feature) that is large and red (i.e. characteristics). Additionally, the characteristics of the features may provide additional information regarding the feature. For example, a driveway (i.e. a feature) may be for a single-family residence instead of for a gas station (i.e. a characteristic of the feature).

The process 200 starts at step 202, in which the remote computing system 150 determines a confidence value associated with a current label of attributes or characteristics of a feature on a portion of a map. The confidence value can quantify a likelihood that the current label is accurate. The confidence value may be determined based on a plurality of different factors including, but not limited to, how recently the confidence value was updated, how recently a response confirming the labeled feature exists, a frequency or total number of responses confirming that the labeled feature exists, etc. The confidence value may also be decremented over time. Similarly, the confidence value may be decremented as the result of information suggesting that the current label should be changed. For example, information that is contrary to or incompatible with the current label may suggest that the current label should be changed.

At step 204, the remote computing system 150 determines a current label on the map that needs to be confirmed. In other words, the remote computing system 150 determines a current label of a feature on the portion of the map or area of the map for user identification. In some embodiments, the remote computing system 150 determines a current label of a feature on the portion of the map or area of the map for user confirmation. One of ordinary skill in the art would understand that both identification and confirmation may be used interchangeably to discuss user identification and/or confirmation. Furthermore, the remote computing system 150 uses the determination of the confidence value of current labels to determine whether the current label of the portion of the map needs to be reassessed. In some embodiments, this may occur when the confidence value drops below a threshold value. Similarly, in some embodiments, the remote computing system 150 may determine that the portion of the map needs to be reassessed when the portion of the map has not been updated and/or reassessed for a threshold amount of time.

At step 206, the remote computing system 150 determines a user that may be suitable for identifying the features of the portion of the map. In some embodiments, the remote computing system 150 may identify a user that is nearby the location. Similarly, in other embodiments, the remote computing system 150 may identify users that have requested use of a rideshare vehicle or the autonomous vehicle 102 to a destination, such that the location may be generally along a route between a general vicinity of the user and the destination.

At step 208, the remote computing system 150 determines whether the user is amenable to identifying features of the location. In some embodiments, the remote computing system 150 may determine from a profile of the user whether the user is amenable to identifying features of the location. More specifically, the profile of the user may have a preference indicating whether the user is amenable to identifying features of locations. In other embodiments, the remote computing system 150 may communicate with the user to ask whether the user is amenable to identifying features of locations. For example, if the user has just requested the rideshare vehicle or autonomous vehicle 102 via a mobile device, the remote computing system 150 may communicate with the mobile device of the user to directly ask the user whether the user is amenable to identifying features of locations. In some embodiments, the user's amenability to identifying features may also be based upon a need to navigate to a different location than the user's current location. For example, the remote computing system 150 may communicate with the user to ask whether the user is amenable to walking a block down the street to identify features of the location a block down. Similarly, the remote computing system 150 may ask and/or determine whether the user is amenable to taking a longer route to their destination. In some embodiments, the remote computing system 150 may also indicate a reward or incentive that the user will receive upon completion of identifying features. For example, the remote computing system 150 may communicate with the mobile device of the user to indicate that if the user identifies features as requested, the user will receive half off their next ride, higher priority to vehicles, an upgrade to a more premium vehicle, etc.

If the user is not amenable to identifying features, the process 200 returns to step 206 and the remote computing system 150 searches for another user.

If the user is amenable to identifying features, the process 200 continues to step 210. At step 210, the remote computing system 150 sends a request to the user to identify features existing at the location. The request may include information that the user should look for. For example, the request may ask the user whether a stop sign remains obscured by large trees. Similarly, the request may send an image or picture of a feature that is expected to be at the location and asks the user to confirm the presence of the feature. Furthermore, the request may indicate types of features to be identified. For example, the request may ask the user to identify stop signs, stop lights, no parking signs, etc. Similarly, the request may ask the user to identify any attributes about the features, such as what color the stop sign is or what type of driveway it is, etc. In some embodiments, the request may request that the user take a picture of the location.

At step 212, the remote computing system 150 determines whether the user is in a rideshare vehicle. In some embodiments, the remote computing system 150 may instead determine whether the user is nearby the location. If the user is not in the rideshare vehicle and/or the user is not nearby the location, the process 200 continues to step 214. At step 214, while the user is waiting for the rideshare vehicle to arrive, the remote computing system 150 sends a communication to a mobile device of the user. In many situations, the user may not be at the location corresponding to the portion of the map for user identification. Thus, the communication may include directions to help the user navigate to the location corresponding to the portion of the map for user identification. When the user is at the location, the communication may provide additional information about requested features of the location. Furthermore, the communication may also indicate that the user will be picked up by the rideshare vehicle at the location. Thus, the communication may direct the user to the location, where the user will wait for the rideshare vehicle to arrive.

Referring back to step 212, if the user is in the rideshare vehicle and/or the user is not nearby the location, the process continues to step 216. At step 216, the remote computing system 150 sends the communication to the rideshare vehicle or autonomous vehicle 102 transporting the user. Again, the communication directs the user to the location. In some embodiments, the rideshare vehicle or autonomous vehicle 102 may utilize the directions in the communication to navigate to the location without additional input or control from the user. In some embodiments, the rideshare vehicle or autonomous vehicle 102 may display the directions to the user. In some scenarios, the location may not be along a quickest and/or most direct route from the pick-up location to the destination. Thus, the directions may navigate the user and the autonomous vehicle 102 to the location then to the destination.

Both steps 214 and 216 continue to step 218. At step 218, the remote computing system 150 receives from the user a response, feedback, or input to the request to identify features existing at the location. The user's response may be transmitted from the mobile device of the user and/or the user interface service 120 of the autonomous vehicle 102 to the remote computing system 150. As described above, the request may have asked the user to send an image or picture of a feature that is expected to be at the location and asks the user to confirm the presence of the feature. Thus, the user's response may simply be a "yes" or "no" type answer to confirm or deny the presence of the feature. Similarly, the user's response may require identification of a labeled and/or expected feature and a location coded picture of the labeled feature. Additionally, the user's response may include identification of features including, but not limited to, stop signs, stop lights, no parking signs, etc. Furthermore, the user's response may simply be a picture of the requested location. In some embodiments where the user is in the rideshare vehicle or autonomous vehicle 102, the user's response may include information gathered from sensors onboard the rideshare vehicle or autonomous vehicle 102 when passing the location. Similarly, in some embodiments where the user is being picked up by the rideshare vehicle or autonomous vehicle 102 at the location, the response may include information gathered from sensors onboard the rideshare vehicle or autonomous vehicle 102 when picking up the user.

At step 220, the remote computing system 150 determines whether the user's response or input matches the current label associated with the portion of the map corresponding to the location.

If the user's response or feedback matches the current label, then the process 200 continues to step 222. When the user's response matches the current label, the user confirms information about the feature that exists in the current label. Thus, at step 222, the remote computing system 150 increments or increases the confidence value associated with the current label.

If the user's response does not match the current label, then the process 200 continues to step 224. When the user's response does not match the current label, the user indicates that the features at the location are no longer the same as the features of the current label. Thus, at step 224, the remote computing system 150 flags the portion of the map for further data gathering. In some embodiments, the remote computing system 150 may implement process 200 again to further gather data. In some embodiments, this may also include decrementing the confidence value associated with the current label of the portion of the map.

Figure 3:
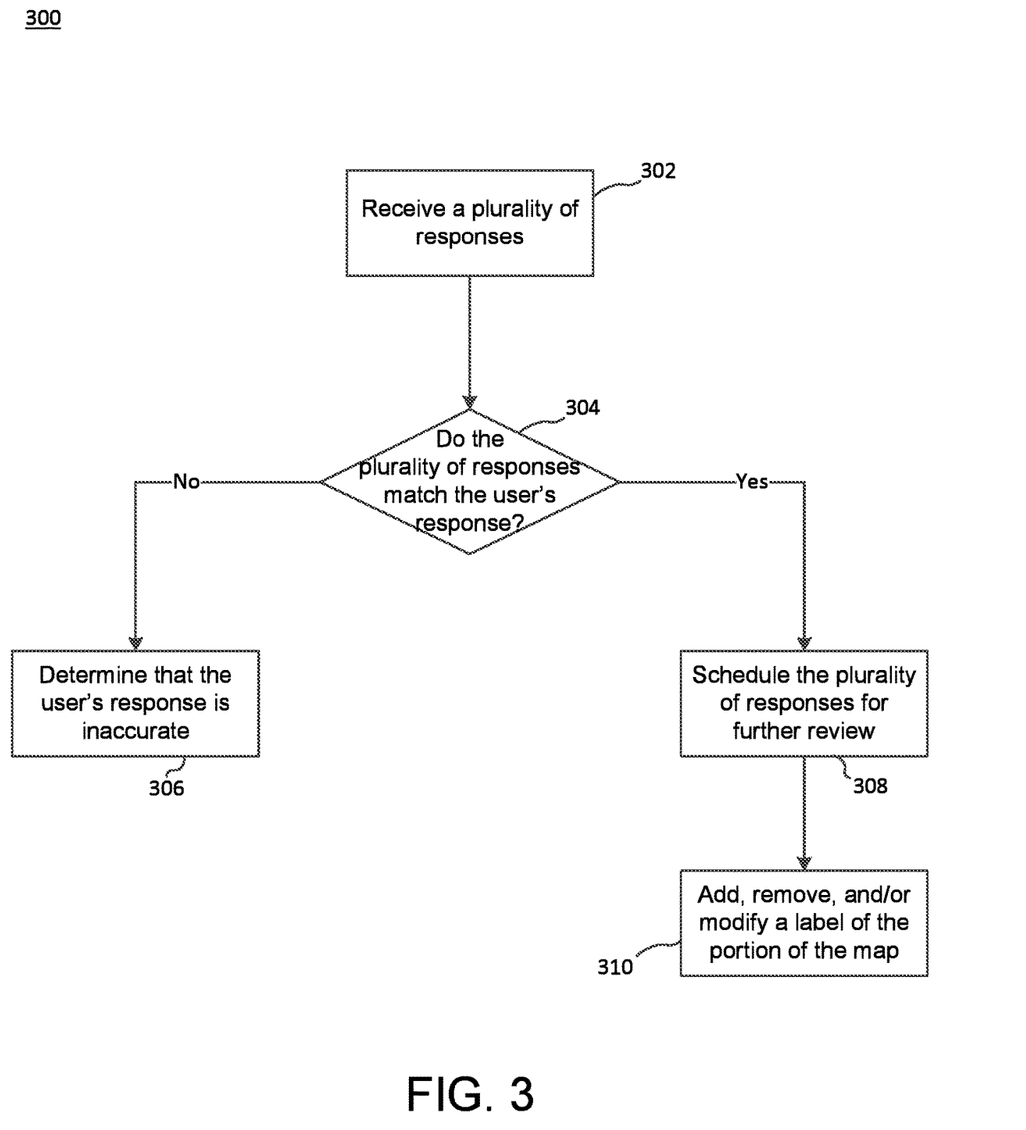
FIG. 3 is a flow diagram that illustrates an example subprocess for crowd sourcing map maintenance.

In some embodiments, the process 200 may continue to a subprocess 300 for additional identification as discussed below.

FIG. 3 is a flow diagram that illustrates an example subprocess 300 for map maintenance. While it is to be understood that the subprocess 300 may be executed by any computing system, the discussion below implements process 300 through the remote computing system 150 for clarity and discussion purposes.

At step 302, the remote computing system 150 receives a plurality of responses. The plurality of responses may be responses from a plurality of respective users to a plurality of respective requests. Furthermore, the plurality of respective requests may ask the plurality of respective users for the same information that was originally requested from the user in process 200. Thus, the plurality of responses provides the remote computing system 150 with more information to determine whether the user's response and/or the current label is accurate.

At step 304, the remote computing system 150 determines whether the plurality of responses match the current label and/or the user's response. In some embodiments, the remote computing system 150 may determine whether the plurality of responses substantially include the same feedback or input of a feature not currently labeled on the portion of the map. In other words, the plurality of responses may include substantially similar feedback or input, such that the feedback or input differs only in wording and convey the same feedback or input.

If the remote computing system 150 determines that the plurality of responses do not match the user's response, then the subprocess 300 continues to step 306. At step 306, the remote computing system 150 determines that the user's response is inaccurate and disregards the user's response. Similarly, the remote computing system 150 may determine that the plurality of responses match the current label, which contradicts the user's response. Thus, the remote computing system 150 may determine that the user's response is inaccurate and disregard the user's response.

If the remote computing system 150 determines that the plurality of responses do match the user's response, then the process continues to step 308. At step 308, the remote computing system 150 schedules the plurality of responses for further review. In some embodiments, the further review may be done through machine learning algorithms to review the information. The machine learning algorithms may be trained by data sets of various accurate and inaccurate responses to determine tendencies and similarities that exist among the various accurate responses and among the various inaccurate responses. Similarly, the remote computing system 150 may communicate with and dispatch an autonomous vehicle 102 to gather more information. Furthermore, the remote computing system 150 may then request human reviewers to determine the accuracy of the above information.

At step 310, after the plurality of responses has been reviewed and are confirmed to be accurate, the remote computing system 150 increments or otherwise increases a confidence level of the current label. The remote computing system 150 may also add, remove, and/or modify a label of the portion of the map. The remote computing system 150 may also mark the label for additional review.

It is further contemplated that the ridesharing application 170 may have an input field that receives information from the user. The user may then submit the information in the ridesharing application 170 to the remote computing system 150, such that the remote computing system 150 may begin process 200 at step 218. In other words, the remote computing system 150 may receive information directly from the user without prompting or requesting such information. For example, the user may notice that construction has just begun in the area causing a road block. The user may then notify the remote computing system 150 that there is now a road block. In some embodiments, the remote computing system 150 may then communicate with and dispatch an autonomous vehicle 102 to gather more information. Furthermore, the remote computing system 150 may then request human reviewers to determine the accuracy of the above information. Once enough confidence is determined, the remote computing system 150 may add a new label to the map.

Figure 4:
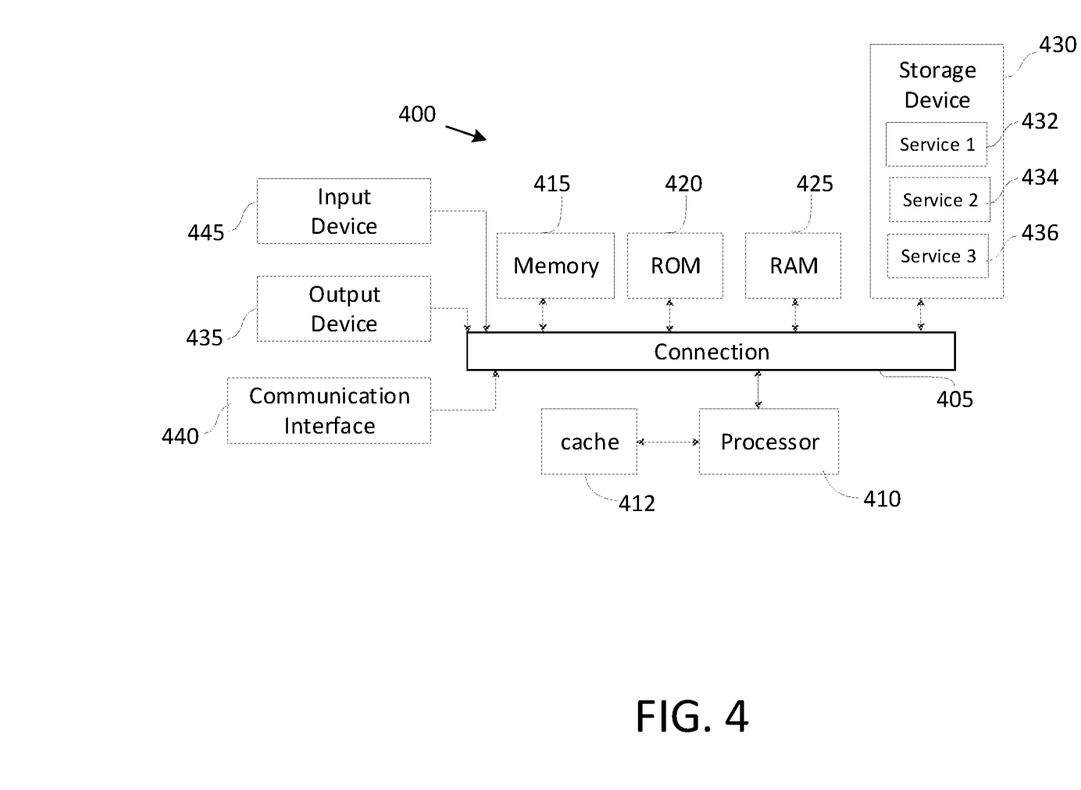
FIG. 4 shows an example of a system for implementing certain aspects of the present technology.

FIG. 4 shows an example of computing system 400, which can be for example any computing device making up internal computing system 110, remote computing system 150, (potential) user device executing rideshare app 170, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer readable-medium comprising instructions that when executed causes at least one processor to:
   determine a confidence value based on how recently the confidence value was updated and a total number of responses confirming that a feature associated with a current label exists;
   determine that the confidence value associated with the current label is below a threshold;
   determine, based on the determination that the confidence value associated with the current label is below the threshold, a portion of a map associated with the current label for user identification, the portion of the map corresponding to a location;
   determine a user located nearby the location;
   send, to the user, a request to identify features existing at the location; and
   receive, from a user, a response to the request to identify features existing at the location, the response including identification of a labeled feature with a location coded picture of the labeled feature,
   wherein the confidence value is decremented over time to determine that the portion of the map needs to be reassessed when the portion of the map has not been reassessed for a threshold amount of time, and wherein the confidence value is incremented as a result of a request response when it is determined that the request response matches the current label at the portion of the map or the confidence value is decremented when it is determined that the request response does not match the current label at the portion of the map.

2. The non-transitory computer readable-medium of claim 1, wherein the request to identify features existing at the location includes information directing the user to the location, the request being sent to a rideshare vehicle transporting the user.

3. The non-transitory computer readable-medium of claim 2, wherein the instructions further cause the at least one processor to:
   prior to sending the request to identify features existing at the location, determine that the user that is being transported by the rideshare vehicle is amenable to a longer route to their destination.

4. The non-transitory computer readable-medium of claim 1, wherein the request to identify features existing at the location includes information directing the user to the location, the request being sent to a mobile device of the user while the user is waiting for a rideshare vehicle to arrive.

5. The non-transitory computer readable-medium of claim 1, wherein the request to identify features existing at the location indicates types of features to be identified.

6. The non-transitory computer readable-medium of claim 1, wherein the request to identify features existing at the location includes a picture of a feature that is expected to be at the location, and the request asks the user to confirm presence of the feature.

7. The non-transitory computer readable-medium of claim 1, wherein the instructions are further effective to cause the at least one processor to:
   after receipt of the response, determine that the response does not match a current label at the portion of the map corresponding to the location; and
   flag the portion of the map for further data gathering.

8. The non-transitory computer readable-medium of claim 1, wherein the instructions are further effective to cause the at least one processor to:
   after receipt of the response, determine that the response matches a current label at the portion of the map corresponding to the location; and
   increase a confidence value associated with the current label.

9. The non-transitory computer readable-medium of claim 1, wherein the instructions are further effective to cause the at least one processor to:
   after receipt of a plurality of responses to a plurality of respective requests to identify features existing at the location provided to a plurality of respective users, determine that the plurality of responses substantially include the same feedback of a feature not currently labeled on the portion of the map; and
   schedule the plurality of responses for further review before adding a label to the portion of the map.

10. A system comprising:
    at least one processor;
    at least one memory storing computer readable instructions that, when executed by the at least one processor, causes the at least one processor to:
    determine a confidence value based on how recently the confidence value was updated and a total number of responses confirming that a feature associated with a current label exists;
    determine that the confidence value associated with the current label is below a threshold;
    determine, based on the determination that the confidence value associated with the current label is below the threshold, a portion of a map associated with the current label for user identification, the portion of the map corresponding to a location;
    determine a user located nearby the location;

send, to the user, a request to identify features existing at the location; and receive, from a user, a response to the request to identify features existing at the location, the response including identification of a labeled feature with a location coded picture of the labeled feature, wherein the confidence value is decremented over time to determine that the portion of the map needs to be reassessed when the portion of the map has not been reassessed for a threshold amount of time, and wherein the confidence value is incremented as a result of a request response when it is determined that the request response matches the current label at the portion of the map or the confidence value is decremented when it is determined that the request response does not match the current label at the portion of the map.

11. The system of claim 10, wherein the request to identify features existing at the location includes information directing the user to the location, the request being sent to a rideshare vehicle transporting the user.

12. The system of claim 11, wherein the instructions further cause the at least one processor to:

prior to sending the request to identify features existing at the location, determine that the user that is being transported by the rideshare vehicle is amenable to a longer route to their destination.

13. The system of claim 10, wherein the request to identify features existing at the location includes a picture of a feature that is expected to be at the location, and the request asks the user to confirm presence of the feature.

14. The system of claim 10, wherein the instructions are further effective to cause the at least one processor to:

after receipt of the response, determine that the response does not match a current label at the portion of the map corresponding to the location; and flag the portion of the map for further data gathering.

15. The system of claim 10, wherein the instructions are further effective to cause the at least one processor to:

after receipt of the response, determine that the response matches a current label at the portion of the map corresponding to the location; and increase a confidence value associated with the current label.

16. The system of claim 10, wherein the instructions are further effective to cause the at least one processor to:

after receipt of a plurality of responses to a plurality of respective requests to identify features existing at the location provided to a plurality of respective users, determine that the plurality of responses substantially include the same feedback of a feature not currently labeled on the portion of the map; and schedule the plurality of responses for further review before adding a label to the portion of the map.

17. A method comprising:

determining a confidence value based on how recently the confidence value was updated and a total number of responses confirming that a feature associated with a current label exists;

determining that the confidence value associated with the current label is below a threshold;

determining, based on the determination that the confidence value associated with the current label is below the threshold, a portion of a map associated with the current label for user identification, the portion of the map corresponding to a location;

determining a user located nearby the location;

sending, to the user, a request to identify features existing at the location; and receiving, from a user, a response to the request to identify features existing at the location, the response including identification of a labeled feature with a location coded picture of the labeled feature, wherein the confidence value is decremented over time to determine that the portion of the map needs to be reassessed when the portion of the map has not been reassessed for a threshold amount of time, and wherein the confidence value is incremented as a result of a request response when it is determined that the request response matches the current label at the portion of the map or the confidence value is decremented when it is determined that the request response does not match the current label at the portion of the map.

18. The method of claim 17 further comprising:

prior to sending the request to identify features existing at the location, determining that the user that is being transported by a rideshare vehicle is amenable to a longer route to their destination, wherein the request to identify features existing at the location includes information directing the user to the location, the request being sent to the rideshare vehicle transporting the user.

19. The non-transitory computer readable-medium of claim 1, wherein the instructions further cause the at least one processor to:

decrement the confidence value of the current label when the response indicates that the current label should be changed.

\* \* \* \* \*